(12) United States Patent
Evans

(10) Patent No.: US 6,283,810 B1
(45) Date of Patent: *Sep. 4, 2001

(54) NON-MOLD METHOD OF FORMING OBJECTS AND ARTICLES FORMED THEREBY

(76) Inventor: Robert B. Evans, 715 Kimball Ave., Santa Barbara, CA (US) 93103

( * ) Notice: Subject to any disclaimer, the term of this patent is extended or adjusted under 35 U.S.C. 154(b) by 0 days.

This patent is subject to a terminal disclaimer.

(21) Appl. No.: 09/466,657

(22) Filed: Dec. 17, 1999

Related U.S. Application Data

(63) Continuation-in-part of application No. 09/195,596, filed on Nov. 18, 1998.

(51) Int. Cl.⁷ .................................................. A63B 31/08
(52) U.S. Cl. ............................ 441/64; 441/61; 428/322.7
(58) Field of Search ................................ 441/64, 61, 106, 441/112, 115; 428/322.7; 623/8

(56) References Cited

U.S. PATENT DOCUMENTS

| Re. 29,394 | 9/1977 | Swanson et al. ................. 277/229 |
| 3,042,562 | 7/1962 | Peterson ............................ 154/43 |
| 4,115,170 | 9/1978 | Sanson .............................. 156/79 |
| 4,157,085 | * 6/1979 | Austad ....................... 128/DIG. 21 |
| 4,379,103 | 4/1983 | Doerfling ........................ 264/45.5 |
| 4,389,358 | 6/1983 | Hendry ........................... 264/45.1 |
| 4,548,861 | * 10/1985 | Barnes et al. ................ 428/322.7 |
| 4,648,880 | * 3/1987 | Brauman ............................ 623/8 |
| 4,721,622 | * 1/1988 | Kingham et al. ................ 426/94 |
| 4,776,358 | * 10/1988 | Lorch ............................... 132/321 |
| 4,860,415 | 8/1989 | Witzke .............................. 29/91.1 |
| 4,944,750 | * 7/1990 | Cox, Jr. ............................... 623/8 |
| 4,946,726 | 8/1990 | Sandvig et al. ................... 428/76 |
| 5,002,047 | 3/1991 | Sandvig et al. ................. 128/90 |
| 5,112,663 | 5/1992 | Morenz et al. ................... 428/71 |
| 5,124,368 | 6/1992 | Gill et al. ....................... 521/111 |
| 5,163,859 | * 11/1992 | Beltrani et al. ................. 441/64 |
| 5,242,321 | 9/1993 | Gil .................................... 441/64 |
| 5,271,885 | 12/1993 | Denker et al. ................. 264/46.5 |
| 5,282,857 | * 2/1994 | Perry et al. ........................ 623/8 |
| 5,338,024 | 8/1994 | Baum ................................ 273/78 |
| 5,411,554 | * 5/1995 | Scopelianos et al. ............. 623/8 |
| 5,435,764 | * 7/1995 | Testa et al. ....................... 441/64 |
| 5,496,370 | * 3/1996 | Hamas ................................ 623/8 |
| 5,604,998 | 2/1997 | Kita .................................... 36/69 |
| 5,654,021 | * 8/1997 | Burger ............................... 426/94 |
| 5,664,518 | 9/1997 | Lewit ............................... 114/357 |
| 5,738,279 | * 4/1998 | Ihle et al. ........................ 238/382 |
| 5,795,204 | * 8/1998 | Bruner ............................. 441/61 |
| 5,824,081 | * 10/1998 | Knapp et al. ....................... 623/8 |
| 5,989,286 | * 11/1999 | Owens ............................ 607/111 |
| 6,004,596 | * 12/1999 | Kretchman et al. ............... 426/94 |

* cited by examiner

Primary Examiner—S. Joseph Morano
Assistant Examiner—Lars A. Olson
(74) Attorney, Agent, or Firm—Cislo & Thomas LLP

(57) ABSTRACT

This invention relates to a non-mold method of forming articles and to the articles themselves wherein various configured articles may be fashioned with conformable material which may be easily fabricated as by sewing, or heat, or sonic welding to form the basic shape of or modular elements of a completed article, and wherein a thermal setting, flowable polymer or the like is introduced into the space between layers of the conformable material to thereby form the completed article or modular element.

10 Claims, 3 Drawing Sheets

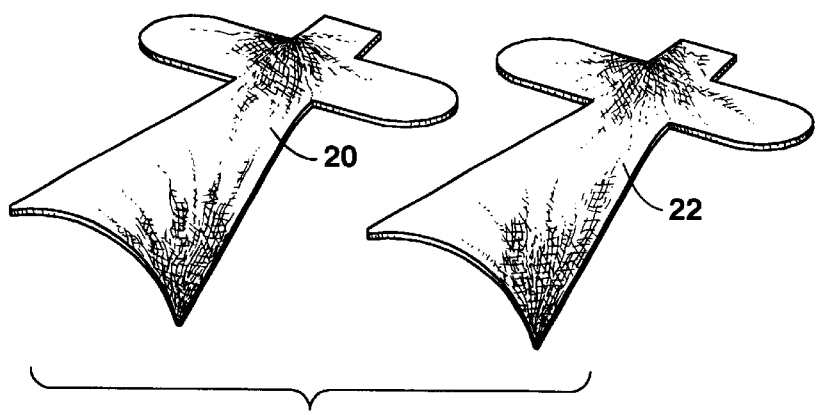
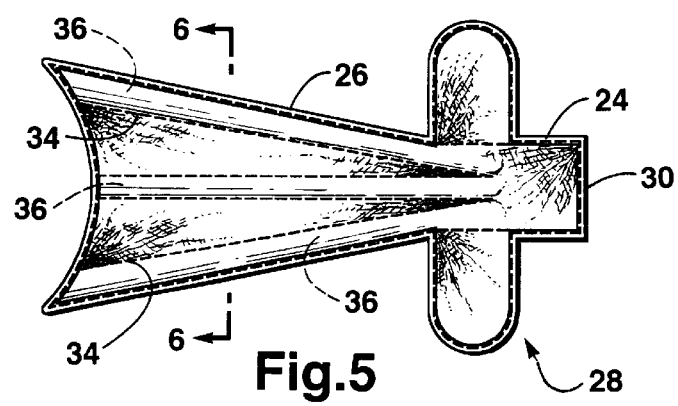
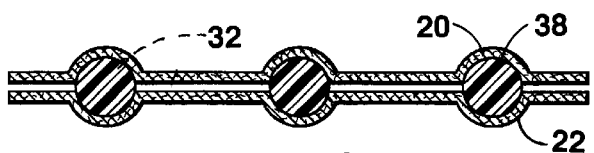
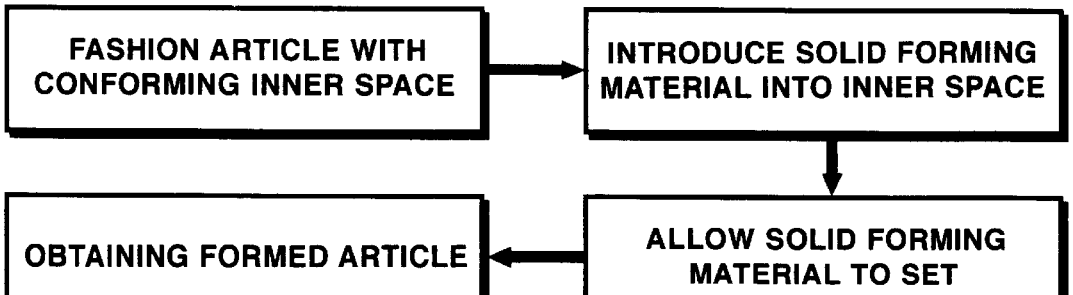

NON-MOLD METHOD OF FORMING OBJECTS AND ARTICLES FORMED THEREBY

RELATION TO OTHER APPLICATIONS

This is a continuation-in-part application of pending U.S. patent application in the name of the same inventor entitled NON-MOLD METHOD OF FORMING OBJECTS AND ARTICLES FORMED THEREBY, application Ser. No. 09/195,596 having a filing date of Nov. 18, 1998.

BRIEF SUMMARY OF THE INVENTION

This invention relates to a non-mold method of forming articles and to the articles themselves wherein various configured articles may be fashioned with conformable material which may be easily fabricated as by sewing, or heat, or sonic or radio frequency welding to form the basic shape of or modular elements of a completed article, and wherein a thermal setting, flowable plastic or the like is introduced into the space between layers of the conformable material to thereby form the completed article or modular element thereof.

BACKGROUND OF THE INVENTION

1. Field of the Invention

This invention relates to the method of forming completed articles or in other instances, modular elements that will be assembled to form a completed article.

The prior art has long recognized a method of forming articles using a molding process where expensive molds are machined and a thermal setting material such as plastic or the like is injected into the mold, allowed to set and thereafter, the mold opened to remove a formed article which then requires, in most instances, some finishing before the article is ready for marketing.

This methodology heretofore utilized has been expensive and time consuming, not only with respect to the initial expense of fabricating the mold, which requires highly skilled labor, but also with respect to the manual labor needed in removing slashing, sanding, or otherwise finishing the molded product to make the same, ready for sale. The herein disclosed invention does away with the need of conventional molds and the molding process in order to fabricate finished articles, which articles may be fashioned from conformable materials which are sewn or otherwise sealed together to form an inner space into which a flowable, thermal setting, resin or the like, is introduced so that the form or mold becomes part of the finished product itself. The overall saving in labor, that is sewing and sonic or radio frequency, or heat welding, being much less than labor required in making molds and operating a molding machine, is readily apparent.

In addition, by making modular-type elements, the total of which makes up the whole of a finished article, individual elements of modular construction, employing designs and colors which would otherwise not be employable, may be assembled in order to form desirable, marketable products.

2. Description of the Related Art

As far as is known, there is no prior art directly related to the herein disclosed invention wherein a formed article is either modularly fabricated and later assembled to complete the finished article, or wherein a non-molding process is utilized as contemplated in the carrying out of the method of the invention.

However, the concept, in the broad sense of having inner and outer skins or layers forming a space into which something is injected is relatively old. Such items as inflatable pool toys and inflatable concrete bags for underwater purposes are well known. But in the case of the inflatable pool toy, a fluid such as air is contemplated as opposed to a liquid solid-forming polymer of this invention. Further, the pool toy form does not become part of a complete article, as contemplated in the instant invention.

As regards to the underwater concrete bag, into which concrete is introduced, the final shape, after setting of the concrete of the concrete bag is determined by the ambient surroundings, such as sea floor, as opposed to the instant invention that utilizes a predetermined shape and configuration for the patterns defining the ultimate shape of the completed article.

But, a prior search has been made and the most specific references found are hereinafter enumerated, but none detract from the patentability of the disclosed invention and the articles formed thereby.

3,042,562—Product and Method for Production of Articles Having Compound Curves—N. R. PETERSON This reference is directed to a product and method for forming articles having compound curves without using a mold. The product can be foamed plastic having slits or grooves extending greater than halfway through the thickness of the sheet. A sheet 10 having slits 12 arranged to form adjacent columns 13 are on the top surface 17 and the bottom surface 18, with the slits staggered to be midway between those on one surface relative to those on the other surface. This slitting provides for a continuous sheet that is very flexible. The sheet 10 is readily formed into a wide variety of complex shapes. A shaped article 21 shown in FIG. 7 is fabricated in accordance with this invention. The shaped article 21 comprises a base shape 10*b* having a plurality of slits 12*f* and 12*g*. The sheet is formed into a concave structure and the sheet and slits are filled with a hardenable material 25. The entire article 21 is then covered with a coating 26. The completed article 21 is rigid and self-supporting. A self-supporting object is made by applying a hardenable cement, grout, or filler material to the grooves or slits opened by flexure of the sheet into a shape. The material upon hardening provides a permanent means for supporting the board in the formed shape. Articles such as boat hulls are readily fabricated by temporarily supporting the slit sheets of polystyrene on a suitable form, coating the sheets with polyester resin woodflower mixture, or epoxy resin woodflower mixture to fill the fissures and then applying a layer of fibrous glass fabric to the outer surface. The slits in the sheet may be in a variety of patterns, as shown in FIGS. 2–5.

RE29, 394—Corrosion Protective Band for Underground Pipe Joints With Metal Parts—Swanson, et al.

This reference is directed to impregnated foam bands for sealing bell and spigot pipe joints. Reinforced concrete pipes 11, 12 having a steel bell ring 13 and steel spigot ring 14 are telescoped together compressing a rubber sealing gasket 17. Protection for the steel members 13, 14 is provided by a pair of bands, a spigot band 21, and a bell band 19. The bands are formed from a polyurethane foam impregnated with Portland cement and sealed for shipping and handling by a water soluble membrane 22. The spigot band 21 is stretched and pulled over the steel spigot ring 14. The bell band 19 is connected to pipe 11 by means of a suitable adhesive. On insertion of the spigot ring 14 into the bell ring 13 of the next pipe, the outer and inner portions of the joint have the spigot band 21 and bell band 19 positioned respectively to protect the steel bell and spigot rings 13, 14. Ground water contacts band 21 and the Portland cement impregnated therein is hydrated. Similarly, the fluid in the pipeline activates the corrosion inhibiting properties of bell band 19.

5,604,998—Sports Shoe Providing Heel Stabilization—Keijiro Kita

This reference is directed to a heel pad for a sports shoe formed of open cell foam impregnated with bouncing putty. A pad 8 of three-dimensional horseshoe shape may be formed from a stack of parts 12 of polyurethane foam impregnated with bouncing putty. The pad may also be formed from a unitary block of polyurethane foam impregnated with bouncing putty and cut into the three dimensional horseshoe shape or a thermoforming process may also be utilized. The pad may comprise a bag-like sheet of synthetic resin 14 enclosing bouncing putty 13. FIG. 11 shows a pad 8 comprising open cell foam 18 impregnated with bouncing putty 17. The pad 8 will have plastic deformation under heel pressure. It will be the same as the bouncing putty itself and exhibit bounce under the impact force applied during athletic sports.

4,946,726—Orthopedic Splinting Articles and Methods Sandvig, et al

This reference is directed to an orthopedic splint of impregnated foam that can be formed around a body part and hardened. The splinting article 10, a unitary blank, is a sheet of pliant foam initially formed as a rectangle for trimming to custom fit a patient. The foam sheet of article 10 is open celled, impregnated by a curable resin. Before applying article 10 to a patient, a cast padding 14 is preferably placed on the patient so as to prevent undesirable adhesion or contact between the splint and the patient. The foam sheet is preferably impregnated with a water curable isocyanate functional polyurethane prepolymer resin.

5,002,047—Orthopedic Pads and Methods—Sandvig, et al.

This reference is directed to foam materials suitable for orthotic pads and methods of preparing the pads using the foam materials. A blank 10 dimensioned as shown to be used as an orthotic foot pad is generally comprised of a pliant extensible foam sheet of extensible foam that is open-celled. The orthotic pad is impregnated with a solventless resin system and then sealed in a water vapor impermeable package which is opened just prior to use. In use, the package is opened and the blank is exposed to water. The patient's foot is positioned on the blank with possibly using an appropriate interface barrier. The foot is held in place with sufficient pressure to cause the surface of the pad to conform to the shape of the bottom of the foot and held until the pad is secured. The appropriate interface material can be a flexible stockinet 14.

5,112,663—Method of Manufacturing Composite Structures Morenz, et al

This reference is directed to a method of making a composite structure, such as an aircraft wing, wherein sheets of flexible, open cell foam are impregnated with a thermosetting resin. A sheet of dry fiber reinforced material is placed on one or both sides of the impregnated foam sheet. The resulting sandwich is wrapped around a foam core and the assembly is placed in a corresponding tool cavity. The tool cavity is heated to a curing temperature and the foam core expands into the confines of the tool.

5,338,024—Golf Club—Charles S. Baum

This reference is directed to a golf club head which is formed with a ball impacting face having an outer layer of wood veneer bonded to an inner layer of synthetic resin reinforced fibers by a synthetic resin which impregnates both layers. The club head is formed by an outer shell being positioned over a molded foam plastic core, wherein the core is covered with a flexible woven resin reinforced fiber sock and, thereafter the impregnation of the sock with an uncured synthetic resin is achieved and, thereafter the composite is cured in forming molds.

5,664,518—Composite Structures and Method of Making Composite Structures—Lewit, et al This appears to be a particularly pertinent patent in the sense that it describes making composite structures wherein a reinforcing fabric, such as fiberglass is mechanically attached by stitching to a non-woven polyester fabric. The attached fabrics are placed in a mold with non-woven fabric facing inside of the mold. A soft, expanding, self-curing foam is put into the mold, in an amount sufficient so that upon expansion in a closed mold, the foam penetrates into the intricacies of the non-woven fabric, which upon curing forms a bond therewith. However, note that a forming mold is required in contradistinction to the instant invention.

DISCLOSURE OF THE INVENTION

This invention relates to the method of forming composite objects or articles comprising the combination of forming patterns of conformable material representative of the component sides of the final shape of the object to be formed and affixing the formed patterns of conformable material along conforming lines to thereby form an intermediate space therebetween, after which a flowable polymer is introduced into the intermediate space. Thereafter, the flowable polymer is allowed to polymerize into a solid after which the formed object is produced whereby the patterns of conformable material and said polymer are integral.

In a more basic, general way, the invention is related to the non-mold method of forming a basic configuration of an article with at least an inner layer and an outer layer of conformable material to thereby form an intermediate space therebetween and introducing a solid forming material into said intermediate space to thereby form a completed object. The formed object may be of selected configuration and comprises at least first and second secured layers of material, having an intermediate polymer solid therebetween, which comprises a modular element in some instances or is capable of further additions to form a completed object of desired shape and in other instances, may be the final object or article itself.

It is an important object of the invention to provide a method of forming objects not requiring molds in the conventional sense.

It is another important object of the invention to provide a method, and articles formed thereby, wherein two layers of material are fashioned into a desired shape by means of securement along their periphery by means of sewing or other bonding methods so that an intermediate space is formed and thereafter, filling said intermediate space with a thermal setting polymer which after setting, forms an integral article of desired configuration and which may be used as a building block or modular element to fashion a completed article.

It is still another more important object of the invention to have a non-mold forming process which does not rely on expensive machinery or labor-intensive, high priced labor in order to form completed articles.

It is still another more important object of the invention to provide a non-mold forming process which does not require molds, expensive machinery, or highly talented labor in order to fabricate or assemble finished articles of desired shape and/or components.

It is another even more specific object of the invention to provide a method of forming objects wherein the pattern or components themselves used in forming the finished article or object becomes part, in an integral manner, of the finished article or object itself.

It is still another more important object of the invention to provide a method of forming modular elements using a non-mold forming process wherein menial labor is utilized for securing components together to thereby form finished articles of enhanced functional characteristics, but of relatively low-cost in terms of tools, jigs, molds, and labor.

It is still another more important object of the invention to provide a non-mold forming process wherein articles are fashioned from conformable material as by sewing, or heat, or sonic or radio frequency sealing so that at least two layers of the material form an intermediate space therebetween into which is introduced, a flowable thermal setting polymer which after setting up, forms the completed article itself or forms a basic modular element which may be easily assembled with other modular elements to provide a finished, fabricated article.

These and other objects of the invention will become more apparent from referring to the hereinafter following commentary or specification taken in conjunction with the drawings.

BRIEF DESCRIPTION OF THE DRAWINGS

FIGS. 2, 3, 4, and 5 illustrate, in sequence, the methodology in one embodiment of the invention in forming the article depicted in FIG. 1;

FIG. 6 is a view taken along the line 6—6 of FIG. 5;

FIG. 7 is a flow chart which schematically illustrates the general methodology of the invention;

DESCRIPTION OF THE PREFERRED EMBODIMENT(S)

Figure 1:
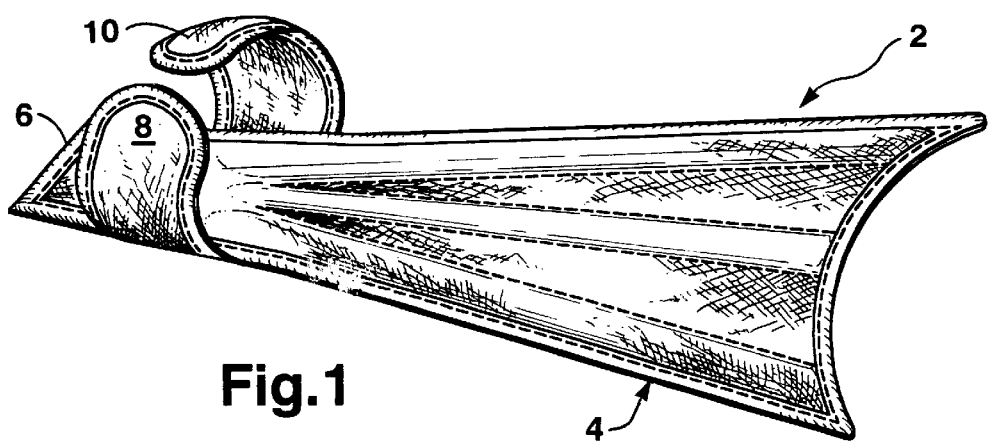
FIG. 1 is a perspective view of one type of article or object that is made in accordance with the invention.

The detailed description set forth below in connection with the appended drawings is intended as a description of presently preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequence may be accomplished by different embodiments that are also intended to be encompassed within the spirit and scope of the invention.

Before going specifically to the drawings illustrating several of the many embodiments contemplated to which the invention may be put, a description of the starting materials would be appropriate.

Polymer

The type of polymer utilized in the practice of the invention will, as those of ordinary skill in the art recognize, depend upon the final products that are to be formed in the practice of the invention. In all instances, a thermal setting plastic is contemplated and its characteristics chosen to more aptly suit the final needs of the product to be formed. That is, where the end product needs to be more flexible, a polymer will be chosen that has a durometer rating most compatible with the end result desired. In other instances where gravity flow, as opposed to pressure injection of the flowable polymer is contemplated, the viscosity of the polymer in the fluid state will become important and those of ordinary skill in the polymer art and in deed, familiar with the characteristics of the end products desired, will be able to readily choose the polymers for the characteristics they possess and which are desired for the final formed product.

For example, with regard to a swimming fin of the type that will be discussed hereinafter, a urethane polymer marketed by Uniroyal Chemical under the trademark VIBRATHANE, has been found to be suitable. The characteristics of VIBRATHANE, designated by Uniroyal Chemical as B-625, has been found to be desirable with regard to its use in the swimming fin used as one example for practicing the invention.

| URETHANE PROPERTIES | |
|---|---|
| VIBRATHANE | B-625 |
| Prepolymer Property | |
| % NCO | 6.09–6.56 |
| Amine equivalent | 665 + 25 |
| Appearance @ 75° F. (24° C.) | Liquid |
| Typical Viscosity @ 212° F. (100° C.), cps (pa-s) | 170 (0.75) |
| Processing Information | |
| 1,4-butanediol level$_1$, pph | 6.4 |
| Vibracure 3095 level$_1$, pph | — |
| Curative temperature, ° F. (° C.) | 140 (60) |
| Vibrathane temperature, ° F. (° C.) | 200 (93) |
| Pot Life, Min.$_2$ | 6 |
| Urethane Properties | |
| Shore Hardness | 85A |
| 100% Modulus, psi (MPa) | 820 (5.6) |
| 300% Modulus, psi (MPa) | 1900 (13.1) |
| Tensile, psi (MPa) | 5400 (37.2) |
| Elongation, % | 460 |
| Tear Strength (D470), pli (kN/m) | 80 (14) |
| Tear Strength, Die C, pli (kN/m) | 540 (94.5) |
| Bashore Rebound, % | 64 |
| Compression Set, 22 Hrs./158° F. (70° C.) Method B, % | 29 |
| Bell Brittle Point, ° F. (° C.) | <–80 (–63) |
| Specific Gravity | 1.09 |

While a specific polyurethane formulation is given, it is to be understood that other specific formulations may be utilized again, depending upon the end results desired and mere reference to manufacturer's specifications similar to those given above, will allow a worker in the art to choose the polymer most suited to selected applications. For example, liquid polyvinyl chloride could be utilized with polyvinyl chloride or polyurethane sheet for the conformable material.

In some instances where a conformable material, as will be described, is used having a layer of plastic or polyurethane thereon, a polymer and catalyst is chosen such that upon introduction and curing of the polymer, the exothermic reaction causes introduced polymer and adjacent plastic or polyurethane layers on the conformable material to coalesce into a single integrated mass.

Conformable Material

The type of material that lends itself most readily for the forming of patterns that are affixed to each other in a sealing relationship to thereby form an intermediate space to receive the flowable polymer may take various forms, but generally will be a polyurethane, polyvinyl chloride or other suitable plastic sheeting material or a fabric of Nylon, Kevlar, Hypalon and similar such polyester fabrics ranging in denier from 70 having 108×86 threads per inch to 200 denier having 40×40 threads per inch. Again, a worker in the art will select and choose a conformable material or fabric depending upon the ultimate end use of the material for the finished article or modular element, keeping in mind the end use to which the same will be put. In some instances, where a fabric is indicated, a courser or finer material will be dictated, as will its being coated with different polymers to aid in the affixing process, especially where sonic welding is contemplated and even in those instances where sewing or other affixing of the materials is employed. In some instance, a mechanical bond between the pile of the conformable material and introduced flowable polymer will be desired and thus, the fabric chosen accordingly. Also, the mesh or scrim of this material will aid in the bonding process between conformable material and introduced polymer. Where plastic sheeting material is utilized, the flexibility or stiffness of the material will dictate its suitability of use in practice of the invention.

Several types of materials that have been found particularly useful for the specific example of a swimming fin, as one of the described embodiments of the invention, is URETEK 1115 put out by Uretek, Inc., wherein the fabric is 70 denier nylon having 108×86 threads per inch and having a polyether polyurethane coating. Another suitable material put out by the same company under URETEK 2651 comprises a Kevlar type 29 material of 200 denier with 40×40 threads per inch and having an aliphatic polyether polyurethane coating. A suitable plastic sheet material for use in swimming fins is a polyurethane sheet offered by J. P. Stevens Company under is designation MP1880. This sheet material is a general purpose, easily thermo-formable polyether polyurethane having the necessary degree of stiffness or flexibility for a wide range of end uses. Also, as previously stated PVC sheet material is also suitable.

Other materials that may be useful in the practice of the invention are offered by Archer Rubber Company and more specifically by the Coated Fabric Group thereof, such materials are a basket weave Nylon under style 9312 with a neoprene coating; style 2163 which is a polyester fabric having a neoprene coating; style 9333 which is a polyester fabric having a neoprene coating; style 2141 which is a 420 denier nylon having a hypalon/neoprene coating; and style 2085 which is 420 denier nylon having a neoprene coating and all such materials will be found to be satisfactory, depending upon the end uses to which the formed article will be put, keeping in mind that the material becomes part of the finished product and thus, a worker in the art will select both material and coatings depending upon color, sheen and other esthetic properties that will be desirable to incorporate into the finished product.

Where a polyurethane sheet material is utilized for a swim fin application, thicknesses in the range of about, by way of example and not limitation, 0.01–05 inch and a durometer of about 70–95A have been found useful. Obviously, other materials, thicknesses and pliability will suggest themselves depending on the end uses to which the conformable material is to be put.

It is only important that the conformable material in most instances be capable of forming bonds with the introduced polymer, be easy to work with in finishing the articles to be produced and be impermeable to the introduced flowable polymer so same does not leak out.

Methods of Forming

The methods of forming articles of the invention are as prolific in number as the imagination of a worker in the art permits. That is, with the simplified mode of fabrication by taking a conformable material whether sheet or fabric, cutting out a pattern and affixing two layers together to form an intermediate space that is filled with a thermal setting plastic, allows for a wide range of manufacturing techniques. In some instances, an element of the assemblage comprising the finished product may be mold formed, as with polyurethane foam, for integration as by sewing, sonic welding or otherwise with modular elements that will make up the remaining assemblage of the end product.

The totality of an article to be formed, where its configuration permits, may be fashioned from the conformable material in sheet or fabric form or individual modular elements thereof may be made and then affixed together, depending upon the end results desired and as will be seen, fabrication methods permit the inclusion of padding, reinforcements or similar such additions. Again, all are dependent upon the final end result to be attained.

Generally speaking, the invention contemplates a conformable fabric material of the type having the characteristic previously described which is easily cut to a configuration that the final article will take. In some instances, the two layers of conformable material or fabric are affixed along their periphery either by sewing, RF welding, sonic welding or other means, it only being important that an intermediate space be formed between the two layers, whether these layers are coated or uncoated, so that the flowable polymer may be introduced. In some instances, in order to prevent ballooning or bulging out during the polymer filling step, seams formed by sewing, RF welding, sonic welding or otherwise may be utilized to limit the amount of intermediate space into which the polymer is introduced.

The simplified method of formation readily lends itself for modular element formation which elements are subsequently affixed, sewn or otherwise secured to each other to form a finished article of desired shape, color and material characteristics.

Where sewing is contemplated, one need only utilize, depending upon the fabric or other material chosen, a heavy duty commercial-type sewing machine in order to provide adequate seaming for both the periphery and intermediate areas of the patterns being formed. In other instances, heat welding by means of radio frequency techniques may be used in which case it becomes important to utilize a polymer coated material to allow for the affixing of two layers of material along a periphery or intermediate section thereof, in order to provide the intermediate spaces into which the polymer is introduced.

Those of ordinary skill in the art will of course recognize other means of formation of a configured article dependant upon the materials selected and the end result desired.

Referring now to the drawings wherein like numerals of reference designate like elements throughout, there will be seen in FIG. 1, one of the exemplars of the practice of one embodiment of the invention. Herein depicted, is an aquatic fin 2 having fin portion 4 and heel portion 6, intermediate of which are upstanding fastening portions 8 and 10 which may be secured around the foot of a wearer's foot by means of velcro, snaps, buckles or the like, not shown.

Figure 2:
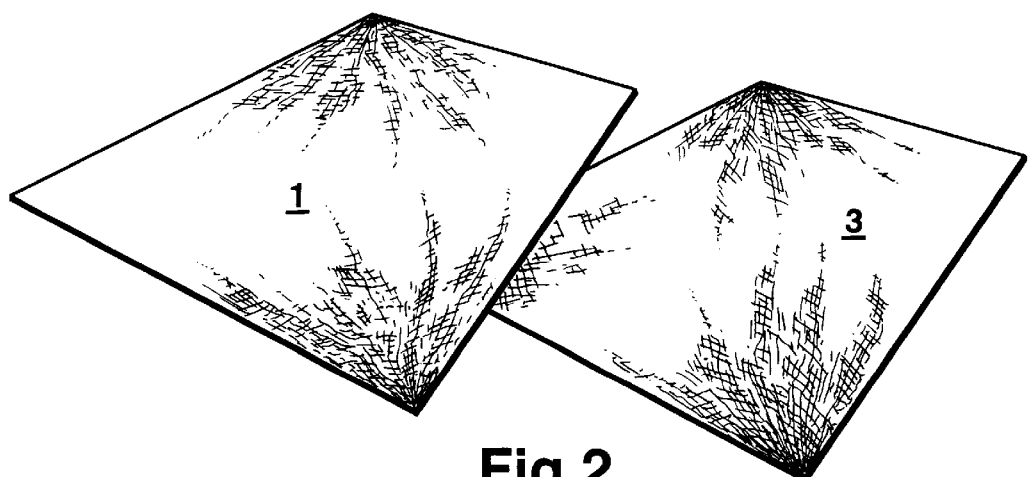
Figure 3:
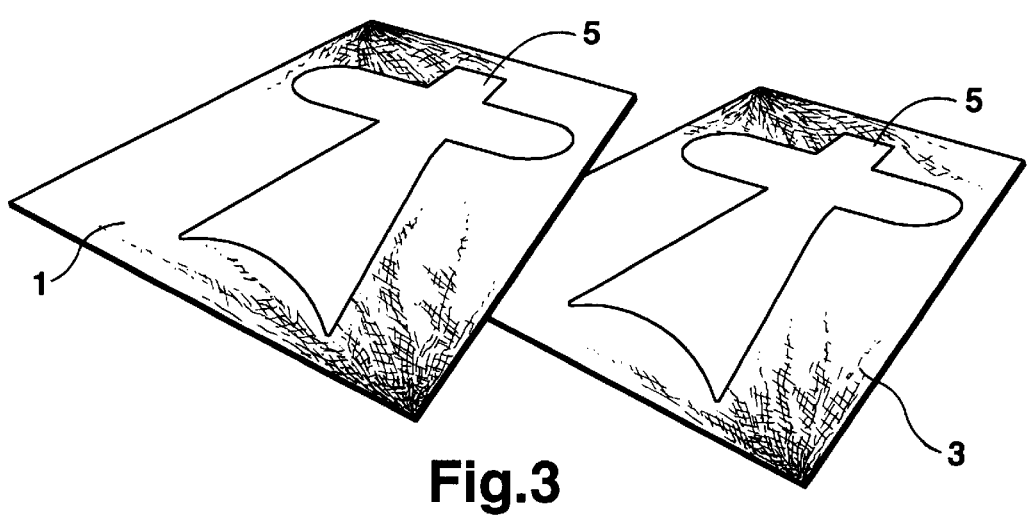

In the fabrication of the fin 2 shown in FIG. 1, two pieces of material 1 and 3, like that heretofore described, are placed in position as shown in FIG. 2 either in side-by-side relationship or superimposed one on the other and a line pattern 5 drawn on each as shown in FIG. 3 in order to obtain two cut-out patterns 20 and 22 which are shown in FIG. 4 and which are superimposed on each other as shown in FIG. 5. The periphery or outer edge 24 formed as by sewing, sonic welding or the like, creates a fixed boundary 26 about the periphery of the assemblage 28 with the exception of a small gap or orifice 30 through which flowable polymer may be introduced into the inner space 32 formed between layers 20 and 22.

The assemblage 28, in addition to having the affixed perimeter 26, is provided with a plurality of spaced seams 34 to form elongate channels 36 into which polymer may be introduced.

Once the assemblage 28 has been sewn, fixed or sonic or radio frequency welded, as heretofore described, polymer 38 such as one previously described is introduced into the opening 30 by means of gravity or pressure injection so as to fill the inner space 32 between the layers 20 and 22 formed by reason of affixing of the perimetric edge 26 and the placement of the seams 34. The formed polymer 38 is best seen in FIG. 6.

In its simplest form, the methodology of the practice of the invention with respect to obtaining the benefits of one embodiment heretofore described is seen in the flow chart of FIG. 7.

There follows, by way of example and not limitation, a specific example of the formation of the fin 2 as shown in FIG. 1 as follows:

EXAMPLE

1. Two sheets of polyurethane-backed nylon cloth are cut according to the fin pattern shape illustrated in FIGS. 2–4.
2. A sheet of nylon mesh is cut according to the same fin pattern shape.
3. The nylon mesh is positioned between two sheets of polyurethane-backed nylon cloth with the polyurethane backing on the inside (toward the mesh).
4. The three pieces are sewn together to form the shape of the fin and cavities as shown in FIG. 5. The edge cavities are sewn to form a cavity or inner space whose cross section starts at one inch at the foot pocket side of the blade and shrinks to one-half inch at the tip of the blade. The center cavity also narrows from one inch to one-half inch, but it only extends half way from the foot pocket to the end of the blade. The cavities extend to the heel of the foot pocket base to form an opening to pour thermoset polyurethane into. The opening extends a minimum of two inches from where the edge of the final product is to be.
5. Thermosetting polyurethane is poured into the heel-end opening and flows to the tip of the blade through the cavities. The initial temperature of the polyurethane is 110° F.
6. The two-inch long excess length of the assembly is rolled onto itself, forcing the polyurethane to fill any cavities not initially filled. This is analogous to rolling the end of a tube of toothpaste, only the goal here is to fill the cavities, not empty them.
7. The thermosetting polyurethane system is formulated so that as it sets up, it exothermetically generates heat to a temperature above 275° F. This melts the polyurethane coating on the nylon cloth and binds it to the thermosetting polyurethane.
8. Once the thermosetting polyurethane sets up, the rolled end is cut off, separate foot pocket buckles or straps are attached, and a completed, non-mold formed fin is obtained.

Figure 8:
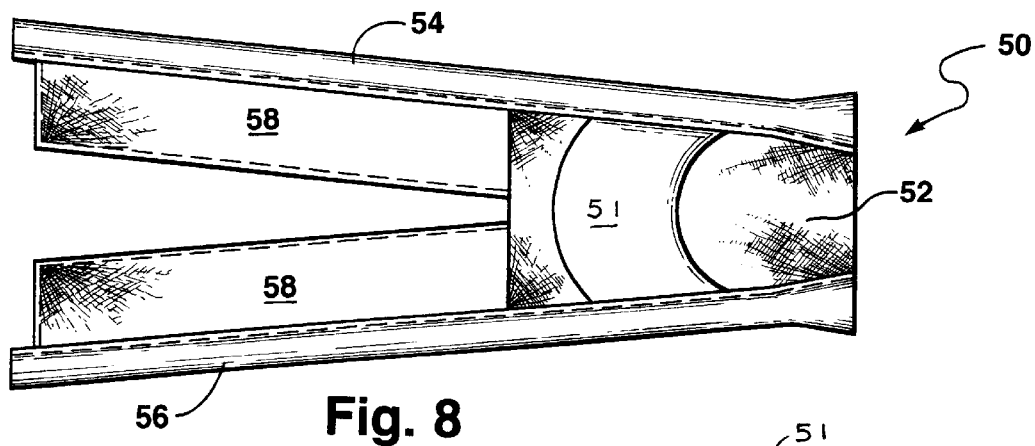
FIG. 8 illustrates the top view of another embodiment of the invention wherein individual components or modular units are utilized to make up the finished article.
Figure 9:
FIG. 9 is a side view of the article shown in FIG. 8.

Referring to FIGS. 8 and 9, there is shown still another embodiment of the invention, which in this particular case, is also directed to the formation of an aquatic fin 50. In the formation of aquatic fin 50, separate heel receiving portions 52 are formed which may be of formed polyurethane foam and which may be fashioned in order to accommodate the human foot and more specifically, the contours and configuration thereof in both left and right configurations.

In the fabrication of fin 50, modular elements 54 and 56 are formed using the methodology previously described with respect to fin 2. However, in this particular instance the modular elements 54 and 56 are in elongated form having the polymer introduced therein and which elements are assembled, as by sewing or other affixing, to intermediate web portions 58 which may be a singular layer of material such as semi rigid polyurethane or a composite involving two layers affixed together having the polymer therebetween. A wide range of attractive colors may be used for the various components to make an aesthetically pleasing design. Subsequently, a previously formed foot receiving portion 51 and a separate foam heel portion 52 is sewn or otherwise affixed to the two elongate members 54 and 56 and thereafter, a strap or other affixing means, not shown, may be secured to the lateral sides of the foot receiving portion 51 by which the fin 50 may be securely fastened to the ankle of a wearer of the fin 50.

In the construction of the fin 52 illustrated, various foam inserts for example may be placed in the bottom of the heel portion 52 and in deed, separate foam elements may be fastened and secured into separate upstanding portions 8 and 10 as shown in FIG. 1 for fin 2. In other words, individual modular elements or components of the finished article, in this case for example, fin 50 may be fabricated and easily affixed, one to the other as by sewing, bonding or other means well known in the art.

Figure 10:
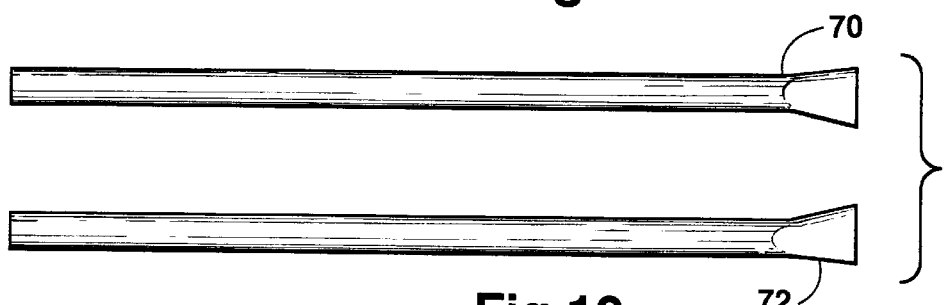
FIG. 10 is a top view of another embodiment of the invention showing the modular concept of the methodology of the invention as applied to a specific object such as a swim fin.

Referring now to FIG. 10, there is shown separate elongate members 70 and 72 which are fashioned of a plurality of layers of materials previously described forming the inner space into which a polymer may be injected or introduced and in this particular instance, the layers of material may have a plastic coating and the polymer used may be exothermic so that the heat generated melts the plastic layer to cause a coalescence or flowing of one material to the other in order to form an integral mass or assemblage with respect to the thermal setting polymer and the layers of material.

In some instances, those of ordinary skill in the art will recognize that a polymer layer may be desirable in order to ensure the integration of polymer and layers of material as a unified assemblage or mass so that the polymer once set will not move independent of the encapsulation within which it finds itself. In some instances, the mesh size or coarseness of a fabric, for example, may ensure a mechanical attachment or securement between the polymer and the fabric itself.

Those of ordinary skill in the art will recognize that the fin shown in FIG. 1 may have the upstanding portions 8 and 10 separately fashioned, as opposed to being integral as shown and described, and as previously alluded. In order to make a more comfortable fit with respect to the foot and ankle of the wearer, there may be placed between the two layers of material a foam cushioning pad. The upstanding portions 8 and 10 may be separately fabricated and later affixed to the remainder of the fin article.

Other modifications will present themselves. For example in FIG. 10, the two elements 70 and 72 may be secured one to the other to fashion a completed article such as a swim fin wherein elements 70 and 72 are secured to each other by means of an intermediate web of flexible fabric or material such as previously described, in which event there would be a single layer as opposed to the dual layer forming the intermediate web space therebetween in which case, no polymer would be injected.

Figure 11:
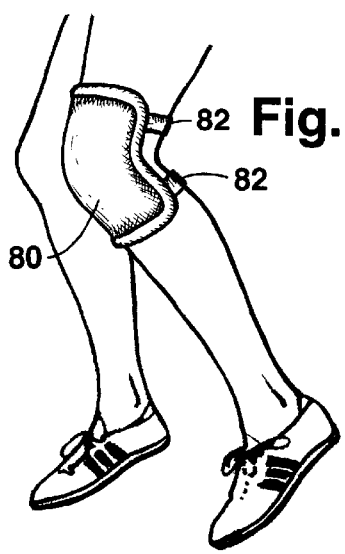
FIG. 11 is a schematic illustration of a different type of formed object, in this case being a knee pad.

Referring to FIG. 11, there is shown a knee pad 80 with elastic fastening members 82 to exemplify the type of objects that may be formed using the methodology of the invention. Following the methodology of the invention, the knee pad pattern is applied to two layers of fabric. The layers are affixed about their periphery and along selective cavities to allow the formation of an intermediate spaces therebetween and thereafter, the introduction of a thermal setting polymer in order to obtain, after solidification, a knee pad of a simple and practical design, which is manufactured in an economical fashion. As those in the art will recognize appropriate sewing, sealing or sonic or radio frequency welding will be desirable and necessary to form curves and to prevent ballooning or bulging.

There are a whole host of articles that may be fashioned utilizing the hereindisclosed invention wherein it is desired and desirable to have material which is utilized to fashion the article become a part of the article itself without the need of molds or a molding process.

Figure 12:
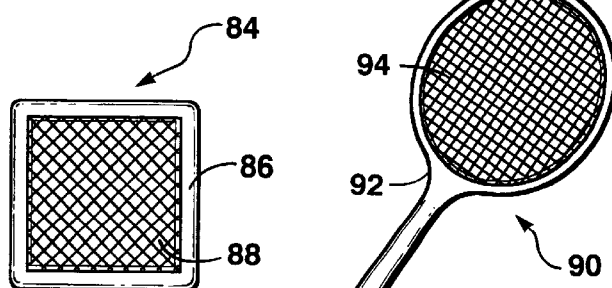
FIG. 12 schematically illustrates still another application of the invention directed to a filter.
Figure 13:
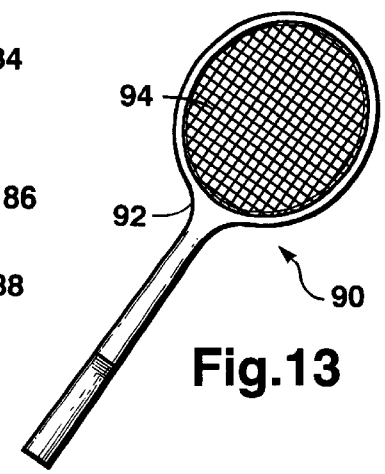
FIG. 13 schematically illustrates the application of the invention to a tennis racquet.

For example, referring to FIGS. 12 and 13, an industrial type filter 84 is illustrated wherein the outer frame 86 is formed by sewing together two opposed pieces of fabric within which is secured screen or filter member 88. Likewise, as shown in FIG. 13, a low cost, easily manufactured tennis racquet 90 has the frame 92 formed as previously described for any article to be formed within which is secured gut or nylon strings 94.

While the present invention has been described with regards to particular embodiments, it should be recognized that additional variations of the present invention may be devised without departing from the inventive concept and the appended claims are intended to cover all such embodiments.

I claim:

1. A method of forming composite objects comprising the combination of:

a) forming two patterns of conformable material representative of a final shape of the object to be formed;

b) sealing said two patterns together along the major periphery thereof to thereby form an intermediate space;

c) introducing a flowable polymer into said intermediate space and allowing said flowable polymer to polymerize into a solid; said two sealed patterns unsupportedly providing said final shape of said object.

d) obtaining the formed object whereby said conformable material and solid polymer are integral.

2. The method in accordance with claim 1 wherein said conformable material comprises a synthetic fabric having a mesh surface on at least one surface thereof facing interiorally of said intermediate space so as to be able to form attachment means for the flowable polymer.

3. The method in accordance with claim 1 wherein at least one of said two patterns has a polymer coating.

4. The method in accordance with claim 3 which includes a web of material within said intermediate space whereby securement of polymer and opposed two patterns of conformable material is obtained.

5. The method in accordance with claim 3 wherein said polymer polymerizes exothermically.

6. The method in accordance with claim 4 wherein said web is a polymer and securement is obtained from the exothermic heat of polymerization.

7. The method in accordance with claim 5 wherein said polymer is chosen to exothermically generate sufficient heat to cause melting of said polymer coating such that coalescence of said flowable polymer and polymer is obtained to form an integral mass.

8. The method in accordance with claim 1 wherein said conformable material comprises a fabric having a sufficiently thick pile on at least one surface thereof facing interiorally of said intermediate space so as to allow the mechanical attachment between conformable material and polymerized flowable polymer.

9. The method in accordance with claim 1 where said conformable material comprises a material selected from polyurethane and polyvinyl chloride sheets.

10. A method of forming a modular composite object comprising the combination of forming two layers of conformable material representative of the modular shape of the element to be formed; sealing the two layers along a major periphery thereof to thereby form an intermediate chamber; introducing a thermal setting flowable polymer into said chamber and allowing said flowable polymer to polymerize into a solid; said two sealed layers unsupportedly providing said modular shape of said element and obtaining the formed modular element whereby the layers of material and said polymer are integral with the outer surface of said conformable material which forms a part of the modular element itself.

\* \* \* \* \*